(12) United States Patent
Legerton et al.

(10) Patent No.: US 7,018,039 B2
(45) Date of Patent: Mar. 28, 2006

(54) CONTACT LENS

(75) Inventors: Jerome Legerton, San Diego, CA (US); Barry Chen, San Diego, CA (US)

(73) Assignee: Synergeyes, Inc., Carlsbad, CA (US)

( * ) Notice: Subject to any disclaimer, the term of this patent is extended or adjusted under 35 U.S.C. 154(b) by 0 days.

(21) Appl. No.: 10/713,874

(22) Filed: Nov. 14, 2003

(65) Prior Publication Data

US 2005/0105045 A1 May 19, 2005

(51) Int. Cl.
*G02C 7/04* (2006.01)

(52) U.S. Cl. .............................. 351/160 R; 351/160 H (58) Field of Classification Search ............... 351/159, 351/160 R, 160 H, 163, 165, 166, 174, 177–8
See application file for complete search history.

(56) References Cited

U.S. PATENT DOCUMENTS

| | | | |
|---|---|---|---|
| 3,594,074 A | 7/1971 | Rosen | 351/219 |
| 3,876,581 A | 4/1975 | Neogi | 521/62 |
| 3,973,838 A | 8/1976 | Page | 351/160 R |
| 4,121,885 A | 10/1978 | Erickson et al. | 351/177 |
| 4,166,255 A | 8/1979 | Graham | 351/160 H |
| 4,171,878 A | 10/1979 | Kivaev et al. | 351/160 R |
| 4,193,671 A | 3/1980 | Erickson et al. | 351/160 H |
| 4,208,362 A | 6/1980 | Deichert et al. | 264/1.7 |
| 4,701,288 A | 10/1987 | Cook et al. | 264/1.3 |
| 4,702,574 A | 10/1987 | Bawa | 351/162 |
| 4,869,587 A | 9/1989 | Breger | 351/161 |
| 4,874,561 A | 10/1989 | Spector | 264/1.1 |
| 5,114,628 A | 5/1992 | Hofer et al. | 369/1.37 |
| 5,422,687 A | 6/1995 | Tanaka et al. | 351/161 |
| 5,433,898 A | 7/1995 | Thakrar et al. | 264/1.7 |
| 5,448,312 A | 9/1995 | Roffman et al. | 351/161 |
| 5,452,031 A | 9/1995 | Ducharme | 351/177 |
| 5,570,142 A | 10/1996 | Lieberman | 351/160 R |
| 5,643,249 A | 7/1997 | Amano | 606/4 |
| 5,662,706 A | 9/1997 | Legerton et al. | 623/5.13 |
| 5,771,088 A | 6/1998 | Perrott | 351/161 |
| 5,777,719 A | 7/1998 | Williams et al. | 351/212 |
| 5,800,532 A | 9/1998 | Lieberman | 623/6.26 |
| 5,800,744 A | 9/1998 | Munakata | 264/1.7 |

(Continued)

FOREIGN PATENT DOCUMENTS

GB 1417650 12/1975

(Continued)

OTHER PUBLICATIONS

International Search Report from PCT mailed Jun. 10, 2005 for corresponding PCT Application No. PCT/US04/36649.

*Primary Examiner*—Jordan Schwartz
*Assistant Examiner*—Jessica Stultz
(74) *Attorney, Agent, or Firm*—Knobbe, Martens, Olson & Bear LLP (57) ABSTRACT

A contact lens is provided. One embodiment of the present invention provides a method for fitting and prescribing a contact lens. Another embodiment of the present invention comprises a contact lens construction that provides a stable prescription platform. Yet another embodiment comprises a contact lens that is constructed to accommodate ectasia associated with keratoconus. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

20 Claims, 3 Drawing Sheets

U.S. PATENT DOCUMENTS

| | | | |
|---|---|---|---|
| 5,807,381 A | 9/1998 | Lieberman | 606/5 |
| 5,835,192 A | 11/1998 | Roffman et al. | 351/246 |
| 5,872,613 A | 2/1999 | Blum et al. | 351/177 |
| 5,880,809 A | 3/1999 | Lieberman et al. | 351/160 R |
| 5,923,397 A | 7/1999 | Bonafini, Jr. | 351/160 R |
| 5,929,969 A | 7/1999 | Roffman | 351/161 |
| 5,949,521 A | 9/1999 | Williams et al. | 351/246 |
| 5,953,098 A | 9/1999 | Lieberman et al. | 351/160 R |
| 5,965,330 A | 10/1999 | Evans et al. | 430/321 |
| 6,043,328 A | 3/2000 | Domschke et al. | 526/279 |
| 6,050,687 A | 4/2000 | Bille et al. | 351/212 |
| 6,082,856 A | 7/2000 | Dunn et al. | 351/160 |
| 6,086,204 A | 7/2000 | Magnante | 351/212 |
| 6,095,651 A | 8/2000 | Williams et al. | 351/246 |
| 6,149,609 A | 11/2000 | Lieberman et al. | 600/587 |
| 6,234,631 B1 | 11/2000 | Sarver et al. | 351/212 |
| 6,199,986 B1 | 3/2001 | Williams et al. | 351/221 |
| 6,241,355 B1 | 6/2001 | Barsky | 351/177 |
| 6,270,221 B1 | 8/2001 | Liang et al. | 351/221 |
| 6,271,914 B1 | 8/2001 | Frey et al. | 356/24 |
| 6,271,915 B1 | 8/2001 | Frey et al. | 356/124 |
| 6,280,435 B1 | 8/2001 | Odrich et al. | 606/5 |
| 6,305,802 B1 | 10/2001 | Roffman et al. | 351/212 |
| 6,325,509 B1 * | 12/2001 | Hodur et al. | 351/160 R |
| 6,338,559 B1 | 1/2002 | Williams et al. | 351/212 |
| 6,340,229 B1 | 1/2002 | Lieberman et al. | 351/160 R |
| 6,379,005 B1 | 4/2002 | Williams et al. | 351/211 |
| 6,379,008 B1 | 4/2002 | Chateau et al. | 351/247 |
| 6,412,946 B1 * | 7/2002 | Vijfvinkel et al. | 351/160 R |
| 6,416,179 B1 | 7/2002 | Lieberman et al. | 351/212 |
| 6,540,353 B1 | 4/2003 | Dunn | 351/161 |
| 6,599,285 B1 | 7/2003 | Lieberman et al. | 606/5 |
| 2003/0123024 A1 | 7/2003 | Dunn | 351/160 R |

FOREIGN PATENT DOCUMENTS

| | | |
|---|---|---|
| WO | 04 045420 | 2/1992 |
| WO | WO 01/28410 A1 | 4/2001 |
| WO | WO 01/89424 A1 | 11/2001 |
| WO | WO 02/30273 A1 | 4/2002 |

* cited by examiner

CONTACT LENS

FIELD OF THE INVENTION

The present invention generally relates to contact lenses. More particularly, the invention concerns contact lens construction features and methods of fitting and prescribing a contact lens.

BACKGROUND OF THE INVENTION

Vision correction is on the verge of a revolution. New technologies to measure the aberrations or distortions in the optics of the eye will soon be available to the public. These new wavefront measurement techniques such as Shack-Hartmann wavefront sensing or Talbot Interferometry can precisely measure the eye's aberrations so that vision may be corrected up to 20/10. Wavefront sensing is the method for rapidly, and very accurately, assessing the aberrations in an individual's eye to create a customized prescription for correction.

However, once the eye's aberrations have been measured, either by conventional methods or by wavefront sensing, these measurements must then be transferred into a vision correction system, such as eye surgery, spectacles, or contact lenses. Recent advances in laser refractive surgery techniques such as LASIK and photorefractive keratectomy, as well as improvements in spectacle lens manufacturing now enable the creation of highly accurate corrective prescriptions for individuals.

However, this is not the case with contact lenses. Popular soft contact lenses cannot achieve the same result as spectacles or laser refractive surgery because of dimensional variations in contact lens fabrication. Hard contact lenses, which may provide the platform to achieve the results of spectacles, are not as comfortable as soft contacts and generally lack the necessary positional stability on the eye.

Therefore, there exists a need for a contact lens that aid in the generation of an accurate corrective prescription and that can provide a stable platform for the prescription.

SUMMARY OF THE INVENTION

A contact lens is provided. One embodiment of the present invention provides a method for fitting and prescribing a contact lens. Another embodiment of the present invention comprises a contact lens construction that provides a stable corrective prescription platform. Yet another embodiment comprises a contact lens that is constructed to accommodate ectasia associated with keratoconus.

For example, in one embodiment, a contact lens constructed according to the present invention comprises a central portion including an optical zone, and a peripheral portion surrounding the central portion. The peripheral portion has a first thickness, and it includes at least two areas of unequal size, with each area having a thickness less than the first thickness. Alternatively, one area may have a thickness less than the first thickness, and the second area may have a thickness greater than the first thickness. This contact lens construction provides a platform that resists rotation, thereby maintaining the contact lens in the desired rotational orientation on an eye.

These and other features and advantages of the present invention will be appreciated from review of the following detailed description of the invention, along with the accompanying figures in which like reference numerals refer to like parts throughout.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention relates to contact lenses, and includes both homogenous lenses, and hybrid hard-soft contact lenses. In one embodiment of the present invention, a contact lens includes areas, or regions of unequal size that are thinner than adjacent regions of the contact lens. One feature of this embodiment is that the contact lens provides rotational stability and therefore maintains a correct rotational position on a wearer's eye.

In another embodiment of the present invention, a contact lens may include a recess that is sized to accommodate a keratoconus or other type of ectasia. Specifically, an ectasia is a bump or raised feature on an eye. The contact lens constructed according to the present invention would include a recess sized to accommodate this bump, therefore allowing individuals with keratoconus to comfortably wear a contact lens.

Another embodiment of the present invention includes different marks that are placed on the lens. These marks are used by an optometrist or other contact lens provider to determine if the lens is correctly positioned on the eye. Specifically, the rotational as well as translational position of the lens on the eye can be determined using the marks constructed according to the present invention.

Contact lenses that contain the features of the present invention may be "hard" lenses, "soft" lenses, or hybrid hard-soft contact lenses that are comprised of a substantially rigid central portion and a softer, flexible outer portion.

Figure 1:
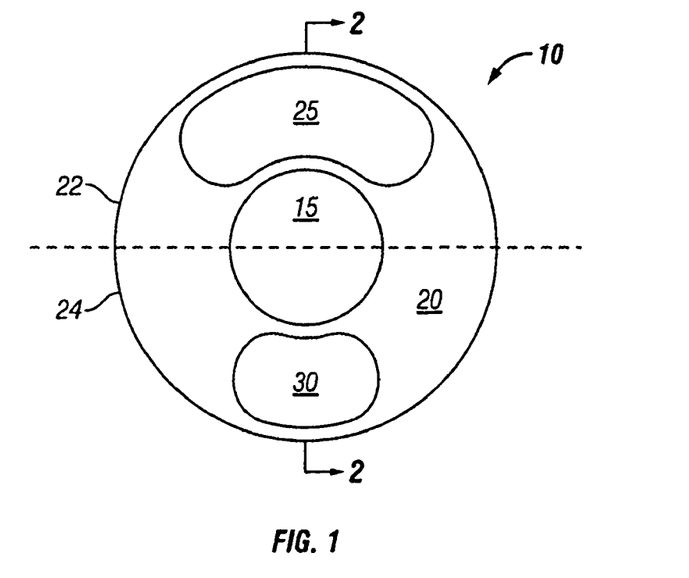
FIG. 1 is a plan view of a contact lens constructed according to one embodiment of the present invention.

Referring to FIG. 1, a contact lens 10 is illustrated. The contact lens 10 includes a central portion 15 and a peripheral portion 20. The central portion 15 has a diameter that is at least as large as the optical region of an eye lens. That is, the central portion 15 has an outer diameter that is at least as large as the outer diameter of an iris of an individual's eye. Thus, the central portion 15 includes the optical area, or zone that provides corrective vision to the wearer. This central portion 15 may have a diameter that may range between about 4.0 mm to about 12.0 mm. The peripheral portion 20 may have an outer diameter that may range between about 10.0 mm to about 18.0 mm.

The peripheral portion 20 includes a first region or area 25 and a second region or area 30. As shown in FIG. 1, these regions 25 and 30 are asymmetrical, or unequal in area. Illustrated in FIG. 2, the first area 25 and second area 30 comprise recesses on the peripheral portion 20 that are thinner than adjacent areas on the peripheral portion 20. In this embodiment, because the first region 25 has less mass than the second region 30, the contact lens 10 will orient itself with the second region 30 aligned with the earth's gravity. That is, because the top half 22 of the contact lens 10 has less mass than the bottom half 24 of the contact lens, the contact lens 10 will orient itself with the greater mass aligned with the earth's gravitational pull. This will maintain the rotational orientation of the contact lens in the desired position, thereby providing a stable platform for a corrective prescription.

Figure 2:
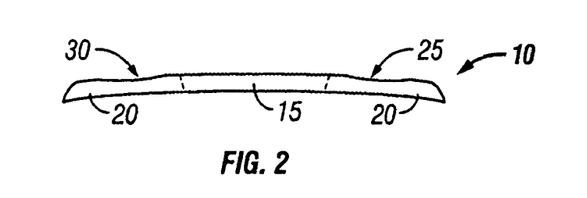
FIG. 2 is a sectional view taken along cutting plane 2—2 of FIG. 1.

An alternative embodiment may also have regions 25 and 30 that are asymmetrical, or unequal in area. However, in this embodiment, the first area 25 may include a recess, but the second area 30 may comprise a bump. That is, the second area 30 may have a thickness greater that an adjacent peripheral portion 20 thickness. Similar to the first embodiment, because the first region 25 has less mass than the second region 30, the contact lens 10 will orient itself with the second region 30 aligned with the earth's gravity. That is, because the top half 22 of the contact lens 10 has less mass than the bottom half 24 of the contact lens, the contact lens 10 will orient itself with the greater mass aligned with the earth's gravitational pull.

Alternatively, the first and second regions 25, 30 may be positioned in any area of the peripheral portion 20, and any relationship relative to each other. In this embodiment, the regions 25, 30 may work in conjunction with eyelid forces that may vary between the upper and lower eyelids. In this embodiment, the dominant force on the contact lens 10 may be the eyelid forces rather than gravity.

Again referring to FIG. 1, the shape, and orientation of the first region 25 and second region 30 may vary, and include any number of suitable configurations. For example, as shown in FIG. 1, the general shape of one embodiment of each region 25 and 30 will accommodate the outer diameter of the contact lens 10. Specifically, the medial most portion of each region 25, 30 may be described by the radial distance from the geometric center of the contact lens 10. Similarly, in this embodiment, the peripheral-most portion of each region 25, 30 may be described by the radial distance from the geometric center of the contact lens 10. Other constructions may define a width of each region 25, 30 by an angle subtended from the geometric center of the contact lens 10. Regarding the depth of the recess that forms each region 25, 30, the depth may be described by the departure from a sphere comprising the posterior portion of the contact lens 10. The depth of each region 25, 30 may also vary, to achieve the desired lens stability requirements.

In addition, in alternative embodiment contact lenses 10, the location of the first region 25 and second region 30 may vary. That is, the radial position of each region 25, 30 may vary to suit individual lens requirements. Moreover, as shown in FIG. 2, each region 25, 30 is located on the anterior, or front surface of the contact lens 10. Alternatively, each region 25, 30 may be located on the posterior, or rear (eye facing) surface.

Figure 3:
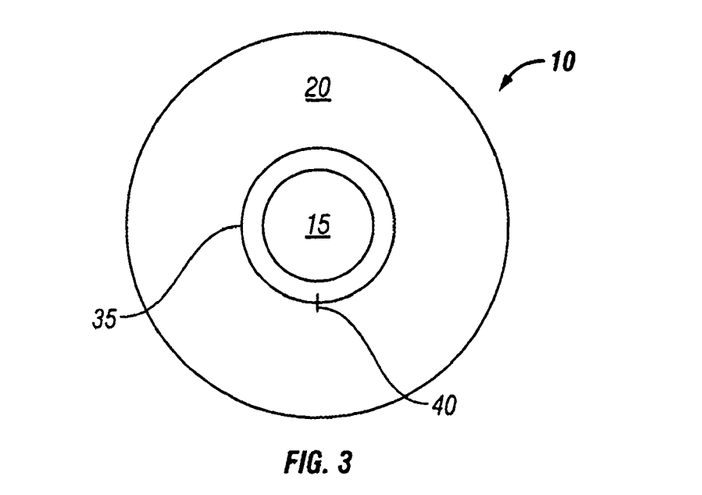
FIG. 3 is a plan view of a contact lens constructed according to a second embodiment of the present invention.

Referring now to FIG. 3, another embodiment of the contact lens 10 is illustrated. This embodiment includes a central portion 15, a peripheral portion 20, and a circumferential mark 35 as well as a radial mark 40. One feature of the present invention involves a method or system for fitting and obtaining a corrective prescription for a contact lens. In this embodiment, an optometrist or other contact lens provider employs one or more "fitting" contact lenses. The provider places one, or two, of these "fitting" contact lenses on an individual as part of the process to obtain a corrective prescription.

Of interest to an optometrist during the process of obtaining a corrective prescription, is the relative relationship between the patient's eye lens and the center of the patient's eye pupil or the visual axis of the patient's eye. Often, an individual's eye lens is not aligned with the center of their pupil or not aligned with the visual axis of their eye. This misalignment is known as registration disparity or registration error. To obtain a very accurate corrective prescription, it is generally desirous to know this registration error so that the corrective prescription can be placed in the correct location on the contact lens 10.

In one method of the present invention, a fitting contact lens 10 is placed on the eye, and the marks 35, 40 are employed to aid in determining the registration error. The residual optical errors are also determined, and a final contact lens prescription is obtained.

In an embodiment of the present invention a contact lens 10 will be manufactured to include quarter-wavelength customization in order to correct for the higher order refractive aberrations that limit one's ability to see better than 20/20. Other embodiments of the present invention will correct normal ametropic errors (myopia, hyperopia and astigmatism) to a higher degree of visual performance than conventional contact lenses. Another embodiment of the present invention will correct for the wavefront-guided higher order aberrations and will create a new contact lens category, providing "super vision" for those whose visual requirements demand better than 20/20 acuity. Yet another embodiment of the present invention will correct for presbyopia, the gradually increasing inability to focus at close distances that usually begins after age 40. Other embodiments of the present invention may include contact lenses that incorporate several, or all of the above-described features.

An accurate prescription process is desirable when producing contact lenses 10 that include some, or all of the above capabilities. The present invention contemplates several methods of prescribing and fitting a contact lens 10. One method relates to non-rotating lenses for correcting high-order aberrations that include methods of placing the coordinates of the aberration measurement over the coordinates of the pupil. Another comprises methods of placing a multifocal over the coordinates of the pupil and customizing the design of the multifocal with measurements of high order aberrations and pupil size.

Again referring to FIG. 3, the circumferential mark 35 and the radial mark 40 may be placed on either the anterior or posterior contact lens 10 surfaces or within the matrix of either the central portion 15, or in the peripheral portion 20 of the contact lens 10. In one embodiment, the circumferential mark 35 and the radial mark 40 are both located on the peripheral portion 20 of the contact lens 10. Other types of marks may be employed by the present invention. They include: a circumferential mark; a radial mark; at least three marks concentric to a contact lens 10 center and a radial mark; a circumferential mark and a radial mark; a grooved mark; and an elevated mark. The grooved mark may comprise a recess, or indentation on the surface of the contact lens 10, and the elevated mark may comprise a bump, or raised area on the surface of the contact lens 10. The marks described above may be visible to the eye under ambient light, or they may be visible by employing infrared light. In addition, the mark or marks may be made visible by varying of the index of refraction of the contact lens 10 material.

Figure 6A:
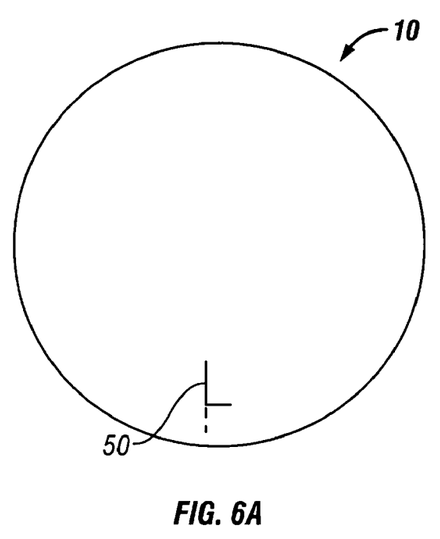
FIG. 6A is a plan view of a contact lens constructed according to yet another embodiment of the present invention.
Figure 6B:
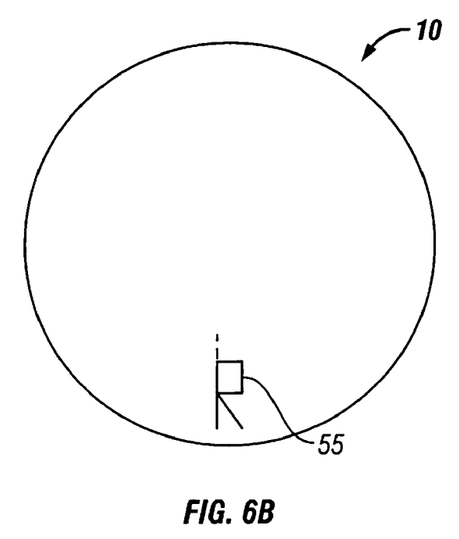
FIG. 6B is a plan view of a contact lens constructed according to a further embodiment of the present invention.

In a preferred embodiment, a contact lens 10 includes two marks that intersect. That is, the mark comprises a first line that intersects a second line. For example, as shown in FIG. 3, the circumferential mark 35 and the radial mark 40 intersect each other. In other embodiments, the mark may include an alphabet letter, such as a "L" or a "R", as shown in FIGS. 6A–B. A discernable L and R on a corresponding left and right contact lens 10 would assist a wearer in placing the correct contact lens 10 on the correct eye. In addition, the marks would aid the individual in correctly orienting the contact lens 10 on the eye.

As shown in FIG. 3, one feature of this embodiment of the present invention, is that the circumferential mark 35 and the radial mark 40 aid in determining the eye lens rotational and translational registration error. That is, the circumferential mark 35 and the radial mark 40 facilitate the lens provider in determining an eye lens rotational and translational registration error relative to a center of an eye pupil or to an eye visual axis. In practice, a "fitting" contact lens 10 containing one or more marks as described above, is placed on an individual's eye. The marks are detectable by a corneal topographer, an aberrometer, a video keratography system, or other devices employed by an optometrist or contact lens provider. By using the marks as a reference, the registration error of the eye can be determined, and a contact lens 10 incorporating a correction for the registration error can be manufactured. That is, the location and orientation of the corrective prescription may be moved on the contact lens 10 based on the registration error information.

For example, a contact lens 10 containing one or more marks as described above is placed on an eye and allowed to equilibrate. The degree of rotational and translational movement is observed by observing the marks. The residual high- and low-order aberrations are measured through the contact lens 10 along with, possibly, the relative coordinates of the lens marks and the pupil margin, limbal margin or other anatomical features. That is, in the preferred embodiment, an instrument having the capability of detecting the contact lens 10 marks and the pupil margin along with the residual high and low order aberrations is used. However, this additional information is not always necessary to obtain a corrective prescription.

An alternative embodiment of the present invention may include infrared-responsive marks, such as one or more registration marks, one or more concentric marks, or other suitable marks, which emit, reflect or are excited by infrared light. For example, some types of wavefront aberrometers employ infrared light, which is generally in the form of a laser. During examination of an eye fitted with a contact lens 10 constructed according to the present invention, the infrared-reflecting marks in the contact lens 10 will be easily visible, enabling simultaneous evaluation of registration error, as well as any aberrations. In one embodiment, indocyan dye is employed, but it will be appreciated that other dyes, powders, or other types of infrared or ultraviolet responsive products may be employed.

Another method of prescribing and fitting a hybrid contact lens employs a set of precision rotating and non-rotating contact lenses 10 having known ocular surface profiles, optical corrections and thickness profiles. In one embodiment, the contact lenses 10 contain one or more circumferential marks 35, radial marks 40 or other types of marks as described above, in the mid-periphery (as shown, in part, in FIG. 3). In this embodiment, a contact lens 10 is selected and applied to the eye and allowed to equilibrate. The coordinates of the marks and the pupil are determined. The aberrations of the lens-eye system are measured. A mathematical model provides analysis of the known thickness profile, the registration error of the coordinates of the contact lens 10 and the pupil, and the residual lens-eye aberrations to derive the computer numerically controlled lathe files for producing a resultant thickness profile for a final contact lens having the same ocular surface profile.

For example, one prescribing and fitting method of the present invention may include the steps of: selecting an initial contact lens 10 to conform to the shape of the underlying cornea; capturing an image of the circumferential mark 35 and/or the radial mark 40, and the pupil margin; measuring the residual low and high order aberrations of the lens-eye system; performing analysis utilizing the known ocular surface profile of the contact lens 10, the initial lens thickness profile, the registration error, and the residual lens-eye aberration error to determine the resultant files for generating a final corrective prescription contact lens.

Another method of the present invention comprises correcting visual acuity deficiencies in presbyopia by reduction of the residual lens-eye aberrations. The method uses a set of contact lenses 10 having a known ocular surface profile and thickness profile and containing one or more circumferential mark(s) 35 and/or radial mark(s) 40 for the purpose of registration of the final optical correction with the coordinates of the optical system of the eye. The method steps may include: selecting the initial contact lens 10 to conform to the shape of the underlying cornea; capturing an image of the circumferential marks 35 and the pupil margin; measuring the size of the pupil in photopic, mesopic and/or scotopic illumination; measuring the residual low and high order aberrations of the lens-eye system; and performing analysis utilizing the known ocular surface profile, the initial lens thickness profile, the registration error, the pupil size and the residual lens-eye aberration error to determine prescription information for generating a final contact lens. In one embodiment of this method, the diameter of the near focused optical correction may be in the range of about 1.8 mm to about 4.0 mm.

Another method of the present invention employs a multifocal contact lens 10 and corrects visual acuity deficiencies in presbyopia by reduction of the residual lens-eye aberrations. The method uses a set of multifocal contact lenses 10 having a known ocular surface profile and thickness profile and containing circumferential marks 35, radial marks 40 or other types of marks as described above, for the purpose of registration of the final optical correction with the coordinates of the optical system of the eye. The method steps may include: selecting the initial lens to conform to the shape of the underlying cornea having a multifocal anterior surface; capturing an image of the circumferential marks and the pupil margin; measuring the size of the pupil in photopic, mesopic and/or scotopic illumination; measuring the residual low and high order aberrations of the lens-eye system; and performing analysis utilizing the known ocular surface profile, the initial lens thickness profile, the registration error, the pupil size and the residual lens-eye aberration error to determine prescription information for generating a final multifocal contact lens. In one embodiment of this method, the diameter of the near focused optical correction may be in the range of about 1.8 mm to about 4.0 mm.

Another method of the present invention employs a multifocal contact lens and corrects visual acuity deficiencies in presbyopia by reduction of the residual lens-eye aberrations. This method also incorporates information relating to a light transmittance pattern. The method uses a set of multifocal contact lenses 10 having a known ocular surface profile and thickness profile, light transmittance pattern, and containing one or more circumferential marks 35, radial marks 40 or other types of marks as described above, for the purpose of registration of the final optical correction with the coordinates of the optical system of the eye. The method steps may include: selecting the initial lens to conform to the shape of the underlying cornea having a multifocal anterior surface; capturing an image of the circumferential marks and the pupil margin; measuring the size of the pupil in photopic, mesopic and/or scotopic illumination; measuring the residual low and high order aberrations of the lens-eye system; and performing analysis utilizing the known ocular surface profile, the initial lens thickness profile, the registration error, the light transmittance pattern, the pupil size and the residual lens-eye aberration error to determine prescription information for generating a final multifocal contact lens. In one embodiment of this method, the diameter of the near focused optical correction may be in the range of about 1.8 mm to about 4.0 mm.

The above-described methods of prescribing and/or fitting contact lens 10 may also employ additional method steps or additional devices. For example: the method of determining the difference in the coordinates of the center of the circumferential marks 35 and the pupil margin may incorporate a reticle of a biomicroscope or a camera with subsequent manual or electronic digital image detection. In addition, the method of measuring the residual aberrations of the lens-eye system may incorporate Shack-Hartmann aberrometry, aberrometers utilizing Tscherning technology, laser ray-tracing or Talbot interferometry technology.

Referring again to FIG. 3, and to the feature of the present invention of using marks on a contact lens 10, an optometrist or other contact lens provider wishing to obtain a corrective prescription uses these circumferential marks 35, 40 during the prescription process to obtain information relating to the rotational as well as the translational position of the contact lens 10 on the individual's eye. Other types of contact lens 10 marks may include only a circumferential mark 35, only a radial mark 40, or as shown in FIG. 3, a circumferential mark 35 used in conjunction with a radial mark 40. Other marks may also include at least three radial marks that are concentric to a contact lens center as well as other suitable types of marks.

As shown in the embodiment illustrated in FIG. 3, the contact lens 10 includes a circumferential mark 35 and radial mark 40. The contact lens 10 is placed on an individual's eye and the optometrist can view the individual's eye pupil, lens and visual axis and using the circumferential mark 35 and/or the radial mark 40 determine any registration error in the individual's eye. Specifically, because the optometrist knows the diameter of the circumferential mark 35 he can still determine the necessary information if he only sees part of the circumferential mark 35 and the radial mark 40. This is because the location of the center of the circumferential mark 35 can be determined even if only part of the circumferential mark 35 is viewable because the diameter of the circumferential mark 35 is known.

Figure 4:
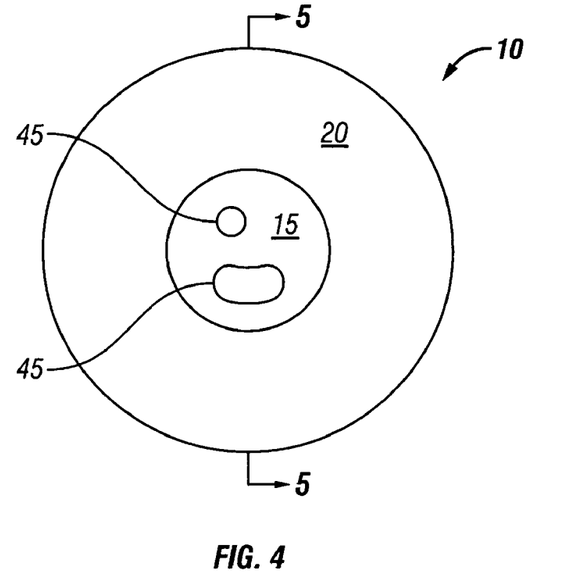
FIG. 4 is a plan view of a contact lens constructed according to yet another embodiment of the present invention.
Figure 5:
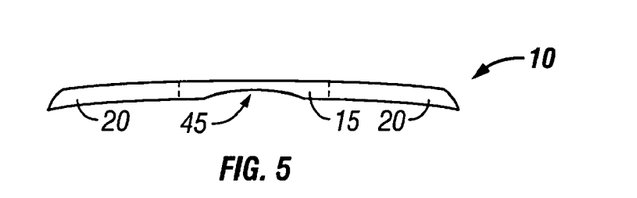
FIG. 5 is a sectional view taken along cutting plane 5—5 of FIG. 4.

Referring now to FIG. 4, another feature of the contact lens 10 constructed according to the present invention is illustrated. The contact lens 10 illustrated in FIG. 4 includes a central portion 15, peripheral portion 20 and one or more recessed areas 45. As shown in FIG. 5, the recessed area 45 is located on the posterior or eye-facing surface of the contact lens 10. The recessed area 45 may be of any shape or size to accommodate a bump or ectasia generally resulting from keratoconus. One feature of this contact lens 10 is that the recessed area 45 can be sized and located on the contact lens 10 so that an individual with keratoconus can wear the contact lens and the recessed area 45 will accommodate the ectasia. This enables individuals suffering from keratoconus to comfortably wear a contact lens 10.

Referring to FIGS. 6A and 6B, another feature of the contact lens 10 is illustrated. As shown in FIG. 6A, a letter "L" is placed on the contact lens and as shown in FIG. 6B, a letter "R" is placed on the contact lens 10. During the fitting of a corrective set of contact lenses 10 the individual wearer can place these lens on the left and right eyes and the practitioner or optometrist can verify the translational and rotational position of the lens by using the "L" and "R" as reference marks. Specifically, the vertical and horizontal components of the "L" can be used as vertical and horizontal indicators to determine rotational and translational position. Similarly, the vertical component of the "R" as well as the horizontal component of the top of the "R" can also be used to verify translational and rotational position. As shown in FIG. 6A–B, an alternative embodiment "L" and "R" may include an extension above the "R" and below the "L" to aide the optometrist in determining rotational and/or translational position.

Specifically, as shown in FIGS. 6A–B, in this embodiment, the top of the R is perpendicular to the vertical side of the R. Similarly, the lines comprising the L are also perpendicular. These perpendicular lines form a small cross, that enables the contact lens provider to determine rotational and translational movement of the contact lens 10 relative to the eye. In addition, the L and R marks may be used by the wearer to assist in placing the lens so the lens is oriented properly in the eye, and that the correct lens is placed in the correct eye.

Figure 7:
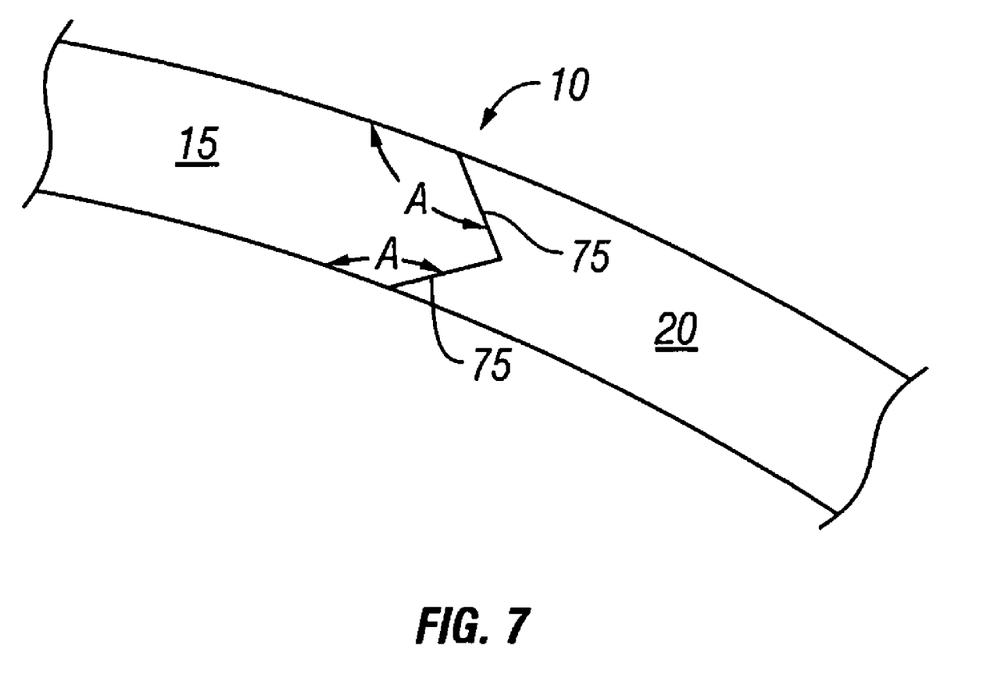
FIG. 7 is a magnified view of a section of a contact lens constructed to another embodiment of the present invention.

The contact lens 10 of the present invention may be either a "hard" lens, "soft" lens, or a hybrid hard-soft contact lens that is comprised of a substantially rigid central portion 15 and a. softer, flexible peripheral portion 20. Referring to FIG. 7, a portion of a hybrid hard-soft contact lens 10 is illustrated. Conventional hybrid contact lenses are generally not durable, in part because of the fragile connection between the hard and soft sections of the lens. One feature of the present invention is that a V-shaped coupling configuration is contemplated that securely couples the hard and soft sections of a hybrid contact lens 10.

As shown in FIG. 7, the central portion 15 is coupled to the peripheral portion 20 at a V-shaped junction. Alternatively, the V-shape, which is comprised of sides, or legs 75, may be switched so that the apex extends into the central portion 15. Each angle "A" may range between about 95 degrees to about 170 degrees. In a preferred embodiment, angle A ranges between about 110 degrees to about 165 degrees. As illustrated, the interface between the hard, or substantially rigid lens material that comprises the central portion 15, and the soft lens material that comprises the peripheral portion 20 is substantially V-shaped. Put differently, the interface comprises two intersecting planes that meet within the lens. This lens junction configuration provides a safety feature in the unlikely case of lens material separation during wear. Because of the V-shape, the edge of the hard lens material comprising the central portion 15 is not "blade" shaped, and thus a sharp edge will not contact the cornea or eyelid, eliminating the risk of cuts, or abrasions.

Thus, it is seen that a contact lens system, method, and article of manufacture is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. It is noted that various equivalents for the particular embodiments discussed in this description may practice the invention as well.

What is claimed is:

1. A contact lens comprising:
   a central portion including an optical zone;
   a peripheral portion surrounding the central portion, the peripheral portion having a first thickness; and
   at least two areas of unequal size located on the peripheral portion, with each area having a thickness less than the first thickness, the areas of unequal size and their sizes configured to induce the self-orientation of the contact lens to a desired orientation on a human eye.

2. The contact lens of claim 1, wherein the thickness of the at least two zones is unequal.

3. The contact lens of claim 1, wherein the contact lens is a hybrid hard-soft contact lens, with the central portion being substantially rigid, and the peripheral portion being substantially flexible.

4. The contact lens of claim 3, wherein the central portion has a diameter that ranges between about 4.0 millimeters to about 12.0 millimeters, and the peripheral portion has an outer diameter that ranges between about 10.0 millimeters to about 18.0 millimeters.

5. The contact lens of claim 1, wherein the central portion has a diameter that ranges between about 4.0 millimeters to about 12.0 millimeters, and the peripheral portion has an outer diameter that ranges between about 10.0 millimeters to about 18.0 millimeters.

6. The contact lens of claim 1, further including a junction between the central portion and the peripheral portion, with the junction comprising a substantially V-shaped surface.

7. The contact lens of claim 1, wherein an angle comprising the substantially V-shaped surface ranges between about 10 degrees to about 170 degrees.

8. The contact lens of claim 1, wherein the contact lens is constructed to include a prescription obtained from a wavefront aberrometer.

9. The contact lens of claim 1, wherein the contact lens is constructed to include a prescription for presbyopia.

10. The contact lens of claim 1, wherein the contact lens is constructed to include a mark for determining a registration error.

11. The contact lens of claim 10, wherein the mark is selected from a group consisting of: a circumferential mark; a radial mark; at least three marks concentric to a contact lens center and a radial mark; a circumferential mark and a radial mark; a grooved mark; an elevated mark; and a mark having a index of refraction greater than an index of refraction in an adjacent material.

12. The contact lens of claim 10, wherein the mark is visible with a light selected from a group consisting of: a light having a wavelength ranging from about 700 nanometers to about 400 nanometers; an infrared light; and a ultraviolet light.

13. A contact lens comprising:
   a central portion including an optical zone;
   a peripheral portion surrounding the central portion, the peripheral portion having a first thickness; and
   at least two areas of unequal size located on the peripheral portion, with a first area having a thickness less than the first thickness, and a second area having a thickness greater than the first thickness, the areas of unequal size and their sizes configured to induce the self-orientation of the contact lens to a desired orientation on a human eye.

14. The contact lens of claim 13, wherein the contact lens is a hybrid hard-soft contact lens, with the central portion being substantially rigid, and the peripheral portion being substantially flexible.

15. The contact lens of claim 13, wherein the central portion has a diameter that ranges between about 4.0 millimeters to about 12.0 millimeters, and the peripheral portion has an outer diameter that ranges between about 10.0 millimeters to about 18.0 millimeters.

16. The contact lens of claim 13, wherein the contact lens is constructed to include a prescription obtained from a wavefront aberrometer.

17. The contact lens of claim 13, wherein the contact lens is constructed to include a prescription for presbyopia.

18. The contact lens of claim 13, wherein the contact lens is constructed to include a mark for determining a registration error.

19. The contact lens of claim 18, wherein the mark is selected from a group consisting of: a circumferential mark; a radial mark; at least three marks concentric to a contact lens center and a radial mark; a circumferential mark and a radial mark; a grooved mark; and an elevated mark.

20. The contact lens of claim 18, wherein the mark is visible with a light selected from a group consisting of: a light having a wavelength ranging from about 700 nanometers to about 400 nanometers; an infrared light; and an ultraviolet light.

* * * * *

UNITED STATES PATENT AND TRADEMARK OFFICE
CERTIFICATE OF CORRECTION

| | | |
|---|---|---|
| PATENT NO. | : 7,018,039 B2 | Page 1 of 1 |
| APPLICATION NO. | : 10/713874 | |
| DATED | : March 28, 2006 | |
| INVENTOR(S) | : Jerome Legerton et al. | |

It is certified that error appears in the above-identified patent and that said Letters Patent is hereby corrected as shown below:

Title page, column 1 item 56 (U.S. Patent Documents), line 13, please delete "369/1.37" and insert -- 264/1.37 --, therefor.

On Title page page 2, column 1 item 56 (U.S. Patent Documents), line 12, after "351/160" please insert -- H --, therefor.

On Title page page 2, column 1 item 56 (U.S. Patent Documents), line 16, please delete "11/2000" and insert -- 05/2001--, therefor.

On Title page page 2, column 2 item 56 (Foreign Patent Documents), line 1, before "04 045420" please delete "WO" and insert -- JP --, therefor.

Column 2, line 1, please delete "DRAWING" and insert -- DRAWINGS --, therefor.

Signed and Sealed this

Twelfth Day of December, 2006

JON W. DUDAS
*Director of the United States Patent and Trademark Office*